United States Patent [19]

Alsberg et al.

[11] 4,176,104

[45] Nov. 27, 1979

[54] POLYSTYRENE PHONOGRAPH RECORD INJECTION MOLDING COMPOSITIONS OF IMPROVED TRANSPARENCY

[75] Inventors: Henry Alsberg, Northbrook; Dale Skalla, Cicero; William C. Meisenhelder, Downers Grove, all of Ill.

[73] Assignee: The Richardson Company, Des Plaines, Ill.

[21] Appl. No.: 922,794

[22] Filed: Jul. 7, 1978

[51] Int. Cl.$^2$ .......................... C08L 25/06; C08F 2/44
[52] U.S. Cl. .......................... 260/28.5 R; 260/32.6 R; 264/328
[58] Field of Search ...................... 260/28.5 R, 32.6 R; 264/328

[56] References Cited

U.S. PATENT DOCUMENTS

| | | | |
|---|---|---|---|
| 2,132,388 | 10/1938 | Berchet | 260/32.6 R |
| 2,267,685 | 12/1941 | Kyrides | 260/32.6 R |
| 2,752,315 | 6/1956 | Kuettel | 260/28.5 R |
| 3,751,388 | 8/1973 | Tabona et al. | 260/32.6 R |
| 3,888,894 | 6/1975 | Thompson | 260/32.6 R |

*Primary Examiner*—Joseph L. Schofer
*Assistant Examiner*—Peter F. Kulkosky
*Attorney, Agent, or Firm*—Lockwood, Dewey, Alex & Cummings

[57] ABSTRACT

Phonograph record molding compositions having polystyrene as the major constituent are formulated to have wear resistance properties superior to other polystyrene injection molded compositions while generally retaining the transparency of unmodified polystryene. Ethylene-bis-stearamide or a homolog or analog thereof is dissolved within styrene monomer and then the monomer is polymerized to obtain a polystryene matrix having a molecular distribution of ethylene-bis-stearamide or the like within and throughout the matrix. Preferably, the ethylene-bis-stearamide or the like is combined with a wax such as an olefin-based wax or a microcrystalline wax.

22 Claims, No Drawings

POLYSTYRENE PHONOGRAPH RECORD INJECTION MOLDING COMPOSITIONS OF IMPROVED TRANSPARENCY

BACKGROUND AND DESCRIPTION OF THE INVENTION

The present invention generally relates to molding compositions, particularly to modified polystyrene compositions for injection molding of phonograph records. In this regard, an important embodiment of this invention is directed to an injection molding composition which includes a polystyrene matrix having ethylene-bis-stearamide, one of its analogs or homologs, or blends thereof, generally molecularly distributed throughout the matrix in order to provide an injection molding composition that is transparent when injection molded into phonograph records and which provides phonograph records having improved wear resistance and superior initial sound quality.

Traditionally, phonograph records are molded from either a polystyrene material or a vinyl material such as polyvinyl chloride, the latter having to be compression molded, whereas polystyrene formulations are able to be injection molded. Polystyrene materials promise certain advantages over the vinyl based materials by virtue of their ability to be injection molded into phonograph records at a lower cost, in a shorter period of time, and with lower energy consumption than compression molded records. Compression molding of vinyl materials produces phonograph records having well-formed grooves approaching that of an ideally formed V-shaped groove, whereas injection molded phonograph records have less well-defined grooves which tend to have rounded rather than sharply defined edges, because when the molding material is injected into an injection mold it must flow from the center thereof and therethroughout, resulting in a significantly rounded groove formation as opposed to the grooves that are more precisely defined with compression molding techniques.

In the compression molding of phonograph records, a thick and pliable biscuit is extruded and then placed in a compression mold and subjected to temperature and pressure conditions which flatten the biscuit to the desired disk shape and form the V-shaped grooves. Injection molding of phonograph records, on the other hand, simply involves delivery of the composition, which is in a powdered or pelletized form, into an injection mold operated at suitable temperature and pressure conditions to produce a phonograph record faster, with less energy, with less manual labor, and with reduced costs when compared with compression molding but which heretofore resulted in a phonograph record having grooves of a much more rounded character than the ideal V-shaped groove.

Also, compression molded phonograph records traditionally have superior wear resistance over injection molded phonograph records, which is especially valuable for molding the larger, long playing type of records where there are an average of about 50 more grooves per radial inch than the number of grooves in the smaller, 45 rpm type of records.

It is known that wear resistance of polystyrene injection molded records can be increased by adding low quantities of various modifiers to improve the lubricity of the molded polystyrene for reducing friction developed between it and a phonograph needle while the phonograph record is being played. Lubricity-enhancing additives that are generally compatible with a polystyrene system and which have been used in the past include linear hydrocarbon waxes, microcrystalline waxes, metal stearates, stearic acid, and natural waxes such as carnauba wax. Detailed descriptions along these lines are found in Skalla et al. U.S. Pat. No. 4,088,617, Lipke et al. U.S. Pat. No. 2,899,400, and Groff et al. U.S. Pat. No. 2,779,744. While molded, unmodified polystyrene is generally transparent, polystyrene that has been modified with such lubricity-enhancing agents produces an injection molded phonograph record that is no longer transparent. Generally transparent or translucent polystyrene record molding compositions are discussed generally in Kuettel U.S. Pat. No. 2,752,315 and Groff et al. U.S. Pat. No. 2,681,323. Both of these patents discuss mechanical blends of various ingredients, including waxes, with polystyrene that had been previously polymerized, resulting in a molding mixture that is a mechanical blend which would not be suitable for use in modern phonograph record injection molding techniques.

By the present invention, an ethylene-bis-stearamide type of compound or synthetic wax is dissolved within styrene monomer which is then polymerized to develop a polystyrene matrix having a generally molecular distribution of the amide synthetic wax compound therewithin to provide an injection molding pellet suitable for forming generally transparent phonograph records and which is a record molding composition that brings with it all of the advantages of polystyrene injection molding while avoiding the disadvantages of poor groove formation, low wear resistance, low initial sound fidelity, and loss of polystyrene transparency heretofore typical of modified polystyrene phonograph record injection molding compositions.

Accordingly, it is a general object of the present invention to provide improved phonograph record molding compositions.

Another object of this invention is an improved composition and method for providing modified polystyrene injection moldable compositions suitable for forming generally transparent phonograph records.

Another object of this invention is an improved method and composition for preparing phonograph records that have been injection molded with modified polystyrene into generally transparent phonograph records.

Another object of the present invention is an improved molding composition and method for providing injection molded, modified polystyrene phonograph records having improved wear resistance and improved initial sound fidelity.

Another object of this invention is an improved record molding composition and method for preparing polystyrene phonograph records that are substantially transparent and that exhibit superior initial sound fidelity as well as extended wear resistance.

These and other objects of the present invention will be apparent from the following detailed description of the record molding compositions.

As noted hereinabove, an important aspect of the present invention concerns the discovery that when ethylene-bis-stearamide or an analog thereof is dissolved within styrene to form a solution which is thereafter polymerized into a modified polystyrene injection molding composition, that composition imparts desirable properties to the polystyrene to enhance its phonograph record forming attributes while at the same time avoiding the loss of polystyrene transparency that is observed with other lubricity-enhancing polystyrene modifiers. It has been further discovered that these properties are retained even when an additional lubricity modifier, especially that within certain classes of waxes, is included within the styrene solution formulation.

The sytrene modifiers in accordance with this invention possess several specific properties which make them highly desirable for use in accordance with this invention. When dissolved within the sytrene monomer, they do not significantly inhibit its polymerization. These modifiers are soluble or miscible with the styrene monomer and remain so even at polymerization temperatures, but they exhibit a limited compatibility with the polymer after it is formed so that they become homogeneously distributed within and throughout the molded polymer to bring about their controlled migration to the surface of the injection molded record, particularly at and below the surfaces of phonograph record grooves in order to impart a time-release aspect thereto which provides anti-friction lubricity during the initial playings of the phonograph records and during a substantial number of subsequent playings. This time-release or controlled-migration feature is enhanced, and transparency is maintained, when compositions in accordance with this invention are injection molded into a cold mold in order to quench the composition to avoid substantial heat-generated migration of the lubricity agent to the surface of the molded record.

Lubricity-enhancing modifiers of this invention are compounds or synthetic waxes that have the following general structure:

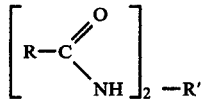

wherein R is alkyl having from about 14 to about 19 carbon atoms, preferably straight-chain alkyl; and R' is alkyl or alkane having from about 2 to 5 carbon atoms. Illustrative examples include ethylene-bis-stearamide, ethylene-bis-palmamide, propylene-bis-stearamide, propylene-bis-palmamide and the like. The preferred lubricity-enhancing modifier is ethylene-bis-stearamide, having a melting point on the order of 145° C. (293° F.). The amount of this modifier that is dissolved within the styrene in accordance with this invention is between about 0.5 to about 4 weight percent based upon the total weight of the modified styrene, preferably between about 1 and about 3 weight percent.

Preferably, the lubricity-enhancing modifier is combined with a secondary lubricating agent additive for improving the wear resistance of the injection molded phonograph record without significantly reducing its transparency. Such secondary lubricating agents will typically be waxes having melting points lower than that of the lubricity-enhancing modifier, including the microcrystalline waxes and the olefin-based waxes. Microcrystalline waxes represent a well-known class of petroleum waxes that are usually by-products from petroleum bottoms. Olefin-based waxes can also be petroleum type waxes that are generally straight-chain, such as paraffin. A microcrystalline type of wax is generally preferred. The lubricating agent is incorporated into the styrene at a concentration such that the total amount of the lubricity-enhancing modifier together with the lubricating agent is between about 1 to about 6 weight percent, preferably between about 3 and 5 weight percent, based on the total weight of the modified styrene.

A conventional flow promoter may be optionally included within the modified styrene formulations to assist in a smooth molding procedure and to act as a general plasticizer. Typical flow promoters include light weight oils such as mineral oil or the like, which are dissolved into the sytrene at between 0 and about 2 weight percent, preferably between about 0.25 and 1 weight percent, based on the total modified styrene weight. Quantities in excess of 2 weight percent undesirably reduce the heat distortion temperature.

Formulations in accordance with the present invention have been found to provide good wear resistance characteristics without having to add metal stearates thereto, which are traditionally incorporated into polystyrene injection molding compositions in order to lubricate and enhance the wear resistance of phonograph records molded therefrom. It has been found that the formulations made in accordance with this invention in the absence of metal stearates are beneficial to maintaining the transparency of phonograph records molded therefrom. The modified polystyrene in accordance with this invention exhibits the usual polystyrene matrix, and the lubricity-enhancing modifier, combined with the lubricating agent additive (if present), is generally molecularly distributed homogeneously within and throughout the polystyrene matrix. Such compositions provide improved polymer flow during injection molding so as to enhance the shaping of the phonograph record grooves close to that of the ideal V-shape of the injection mold itself. This matrix configuration also improves the time-release or controlled-migration characteristics of the mold product whereby the lubricity-enhancing modifier particles or molecules migrate to the top of the internal groove surfaces as other lubricity-enhancing modifier particles are scraped away from the groove surfaces by the phonograph record needle.

In proceeding with the method in accordance with this invention, the lubricity-enhancing modifier, optionally together with the lubricating agent additive, are dissolved within a quantity of styrene monomer to provide a substantially single-phase modified styrene, which modified solution is then polymerized by conventional techniques, usually through either bulk polymerization or suspension polymerization, in order to form a polystyrene matrix having the modifiers substantially molecularly distributed in a generally homogeneous fashion throughout the matrix.

Such polystyrene matrix will typically be in the form of pellets or powders suitable for use within conventional injection molding apparatus, particularly devices suitable for forming injection molded phonograph records which include molding die cavities having a centrally disposed injection inlet and closely spaced grooves that are V-shaped in cross-section and that are substantially annularly positioned so they are generally concentric with the injection inlet. Injection molding takes place at temperatures at or above the melting temperature range of the polystyrene matrix, molding usually being at between about 204° to about 233° C. (400° to 450° F.). The thus melted polystyrene matrix is injected into the phonograph record molding cavities and, in view of its superior lubricity, readily flows into and throughout the volume of the molding cavities and its V-shaped grooves to the extent that it flows well both radially and annularly to form phonograph records having grooves that are well filled, approximating the V-shape of an ideally filled groove.

Prior to injecting the polystyrene matrix, the injection molding die is at a temperature substantially less than that of the molten polstyrene matrix, usually from about 25° to about 66° C. (77° to 150° F.), in order to effect a quenching of the polystyrene matrix to prevent significant amounts of the generally molecularly distributed modifiers from migrating to the surface of the polystyrene during the molding operation, which undesirable migration would occur during compression molding wherein the molding die is hot prior to adding the compression moldable biscuit. Injection molding quenching combines with the properties of the polystyrene matrix in accordance with this invention to resist the formation of large aggregates of the modifiers which would, if formed, crystallize out upon injection molding and move to or toward the surface of the molded phonograph record, thereby substantially reducing the advantageous features of this invention. Such crystallized aggregate formation is believed to be retarded in the present invention because the lubricity modifier formulations are particularly compatible with the polystyrene matrix and are especially susceptible to being uniformly distributed on a generally molecular level throughout the polystyrene matrix, which enhances the ability of the individual modifier particles or molecules to remain generally segregated from each other. When this important aspect of the invention is not followed, the time-release or controlled-migration features will be substantially reduced and the crystalized materials will give the phonograph record a translucent rather than a substantially transparent appearance.

The following specific examples will more precisely illustrate the invention and teach the procedures that are presently preferred for practicing the same.

EXAMPLE I

Two different modified styrene polymer formulations were prepared in substantially the same manner and under substantially the same conditions, one of the formulations (formulation A) being contrary to the present invention, and the other (formulation B) being in accordance with this invention. The additives specified below were dissolved within styrene monomer in the weight percentages indicated, based on the weight of the total composition, after which they were polymerized by conventional polymerization techniques.

|  | A | B |
| --- | --- | --- |
| Microcrystalline Wax | 2 wt. % | 2 wt. % |
| Ethylene-bis-stearamide | none | 2 wt. % |
| Carnauba Wax | 2 wt. % | none |
| Calcium Stearate | 0.5 wt. % | none |
| Mineral Oil | none | 0.63 wt. % |

Each of formulations A and B were used to injection mold phonograph records. Records prepared from formulation A were opaque, while records prepared from formulation B were transparent. Wear resistance properties of each of the formulations were tested by aurally detecting background noise after a selected number of "plays" on a conventional turntable, the results being: after 10 plays, the noise level of formulation B was the same as that of formulation A; after 20 plays, formulation B had a lower noise level than formulation A; and after 30 plays, the noise level of formulation B was still less than that of formulation A. These results show that, although formulation B is transparent in accordance with this invention, this property has no adverse effects on the wear resistance of phonograph records molded therefrom, and the following test results show that the physical properties of the formulations are substantially the same:

|  | A | B |
| --- | --- | --- |
| Melt Index (ASTM D-1238, E) | 1.6 gms./10 min. | 2.0 gms./10 min. |
| Heat Distortion Temp., annealed (ASTM D-648) | 179° F. | 180° F. |
| Tensile Strength (ASTM D-638) | 5400 psi. | 5100 psi. |
| Tensile Elongation (ASTM D-638) | 3.6% | 1.6% |
| Tensile Modulus (ASTM D-638) | $5.4 \times 10^5$ psi. | $5.3 \times 10^5$ psi. |
| Flexural Strength (ASTM D-790) | 10,900 psi. | 10,900 psi. |
| Flexural Modulus (ASTM D-790) | $4.3 \times 10^5$ psi. | $4.2 \times 10^5$ psi. |
| Izod Impact Strength (ASTM D-256) | 0.28 fppi. | 0.31 fppi. |

EXAMPLE II

A polystyrene matrix record molding composition substantially the same as that of formulation B in Example I was used to prepare 12-inch diameter phonograph records by injection molding at a cost savings of approximately 15 percent over vinyl compression molded phonograph records of the 12-inch diameter size, due in large measure to the faster cycle times available, the injection molding proceeding with a cycle of 20 seconds, while compression molding has a cycle of about 25 seconds. The composition in accordance with this invention had a lower specific gravity, resulting in generally higher yields, eliminated the need to deflash, and resulted in less wear of the nickel plate stampers. Between 12,000 to 15,000 records were produced per stamper as opposed to about 2,000 records generaly made for each compression molding stamper. No brittleness problems were encountered, and the records were found to have high impact strength and increased wear resistance properties generally as reported in Example I. Due to the good flow characteristics of the formulation, precise and clean mold filling was achieved, contributing to superior sound quality, especially for initial playings of the phonograph records.

This molding composition was found to have the following average properties: a tensile strength of 5400 psi (ASTM D-638), a tensile elongation of 1.3 percent (ASTM D-638), an Izod impact strength of 0.3 ft-lb/in (ASTM D-256), and a heat distortion temperature of 173° F. (ASTM D-648).

While in the foregoing specification certain embodiments and examples of this invention have been described in detail, it will be appreciated that modifications and variations therefrom will be apparent to those skilled in this art. Accordingly, this invention is to be limited only by the scope of the appended claims.

We claim:

1. A phonograph record injection molding composition comprising a modified styrene polymer composition, said modified styrene polymer being a polymerization product of styrene polymerized with a lubricity-enhancing modifier dissolved therewithin, said lubricity-enhancing modifier having the following structure:

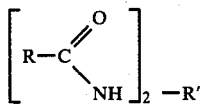

wherein R is alkyl having from about 14 to about 19 carbon atoms and R' is alkane having from about 2 to about 5 carbon atoms, said modified styrene polymer being a polystyrene matrix having said lubricity-enhancing modifier generally molecularly distributed within and throughout said matrix, and said modified styrene polymer being a substantially transparent phonograph record injection molding composition.

2. The molding composition of claim 1, wherein R is straight-chain alkyl.

3. The molding composition of claim 1, wherein said modified styrene polymer includes from about 0.5 to about 4 weight percent of said lubricity-enhancing modifier, based on the total weight of the polymer.

4. The molding composition of claim 1, wherein said modified styrene polymer includes from about 1 to about 3 weight percent of said lubricity-enhancing modifier, based on the total weight of the polymer.

5. The molding composition of claim 1, wherein said lubricity-enhancing modifier is ethylene-bis-stearamide.

6. The molding composition of claim 1, wherein said modified styrene polymer further includes dissolved therein a secondary lubricating agent additive in an amount such that the total quantity of said lubricity-enhancing modifier and said secondary lubricating agent additive together is between about 1 and about 6 weight percent, based on the total weight of the polymer.

7. The molding composition of claim 6, wherein said total quantity together is between about 3 and about 5 weight percent.

8. The molding composition of claim 6, wherein said secondary lubricating agent additive is a wax selected from the group consisting of a microcrystalline wax and an olefin-based wax.

9. The molding composition of claim 1, wherein said modified styrene polymer further includes dissolved therein up to about 2 weight percent of a flow promoter, based on the weight of the polymer.

10. The molding composition of claim 1, wherein said modified styrene polymer further includes dissolved therein between about 0.25 and about 1 weight percent of a mineral oil flow promoter, based on the total weight of the polymer.

11. The molding composition of claim 1, wherein said injection molding composition exhibits wear resistance in the absence of a metal stearate within said modified styrene polymer, said wear resistance being substantially equal to that of said injection molding composition that has been modified to contain a metal stearate therewithin and to exclude said lubricity-enhancing modifier therewithin.

12. The molding composition of claim 1, comprising between about 1 to about 3 weight percent of ethylene-bis-stearamide as said lubricity-enhancing modifier, wherein said modified styrene polymer further includes dissolved therein between about 1 to about 3 weight percent of a wax selected from the group consisting of microcrystalline wax and olefin-based wax, and wherein said injection molding composition exhibits wear resistance in the absence of a metal stearate within said modified styrene polymer, said wear resistance being substantially equal to that of said injection molding composition that has been modified to contain a metal stearate therewithin and to exclude said lubricity-enhancing modifier therewithin.

13. A method for preparing phonograph record injection molding compositions, comprising providing a styrene monomer, dissolving a lubricity-enhancing modifier within said styrene monomer to form a modified styrene formulation, said lubricity-enhancing modifier having the structure:

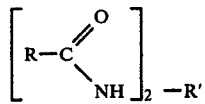

wherein R is alkyl having from about 14 to about 19 carbon atoms and R' is alkane having from about 2 to about 5 carbon atoms, and polymerizing said modified styrene formulation into a composition for injection molding substantially transparent phonograph records.

14. The method of claim 13, wherein said dissolving step incorporates from about 0.5 to about 4 weight percent of said lubricity enhancing modifier into said modified styrene formulation.

15. The method of claim 13, further comprising dissolving a secondary lubricating agent additive into said modified styrene formulation in an amount such that the total quantity of said lubricity-enhancing modifier and said secondary lubricating agent additive together is between about 1 and about 6 weight percent, based on the total weight of the formulation.

16. The method of claim 13, further comprising dissolving up to about 2 weight percent of a flow promoter into said modified styrene formulation, based on the total weight of the formulation.

17. The method of claim 13, further comprising avoiding addition of a metal stearate to said modified styrene formulation while simultaneously maintaining phonograph record wear resistance properties substantially equal to those of said phonograph record molding composition which has been modified to contain a metal stearate and to exclude said lubricity-enhancing modifier.

18. The method of claim 13, further comprising injection molding said phonograph record molding composition into a substantially transparent and wear resistant phonograph record.

19. The method of claim 18, wherein said injection molding step includes injecting said molding composition at a temperature between about 400° and 450° F. and quenching same at a temperature of about 77° to 150° F.

20. A injection molded phonograph record comprising a substantially transparent matrix of polymerized, injection molded modified styrene polymer, said polymer being a polymerization product of styrene polymerized with a lubricity-enhancing modifier dissolved therewithin, said matrix having generally molecularly distributed within and throughout said matrix from about 0.5 to about 4 weight percent, based on the total weight of the matrix, of said lubricity-enhancing modifier of the following structure:

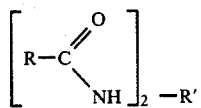

wherein R is alkyl having from about 14 to about 19 carbon atoms and R' is alkane having from about 2 to 5 carbon atoms.

21. The phonograph record of claim 20, wherein said substantially transparent matrix further includes from about 1 to about 3 weight percent, based on the total weight of the matrix, of a microcrystalline wax or an olefin-based wax, and wherein the molded phonograph record has wear resistance properties substantially equal to non-transparent phonograph records that are injection molded from said modified sytrene polymer which has been modified to contain a metal stearate and to exclude said lubricity-enhancing modifier.

22. The phonograph record of claim 20, wherein said lubricity-enhancing modifier is ethylene-bis-stearamide which is present at from about 1 to about 3 weight percent.

* * * * *